United States Patent [19]

Pearl et al.

[11] 3,905,706

[45] Sept. 16, 1975

[54] LIGHT RESPONSIVE BATHYIRRADIOMETER

[75] Inventors: Lowell Raymond Pearl; Roderick S. Mesecar, both of Corvallis, Oreg.

[73] Assignee: The United States of America as represented by the Secretary of the Navy, Washington, D.C.

[22] Filed: Dec. 17, 1973

[21] Appl. No.: 425,380

[52] U.S. Cl. ................ 356/224; 356/226; 250/207
[51] Int. Cl.² .......................................... G01J 1/42
[58] Field of Search.................... 356/218, 224, 226; 250/207

[56] References Cited

UNITED STATES PATENTS

| | | | |
|---|---|---|---|
| 2,972,929 | 2/1961 | Painchaud | 356/226 |
| 3,184,597 | 5/1965 | Scherbatskay | 250/207 |
| 3,514,209 | 5/1970 | McGhee et al. | 356/226 |

Primary Examiner—Ronald L. Wibert
Assistant Examiner—Conrad J. Clark
Attorney, Agent, or Firm—R. S. Sciascia; Charles D. B. Curry

[57] ABSTRACT

A bathyirradiometer that is employed to measure the light levels in situ. The bathyirradiometer includes a photomultiplier that detects light that is received at its light input. A high voltage power supply supplies power to a voltage divider the output of which is connected to the dynodes of the photomultiplier tube. The voltage level of the output of the high voltage power supply is selected by a programmable high voltage regulator. The output of the photomultiplier tube is applied to the input of an automatic range device. One output of the automatic range device is applied to the programmable high voltage range detector to select the voltage to be applied across the dynodes of the photomultiplier tube. The other output of the automatic range device is applied to one input of a scanner to indicate the particular voltage range of operation. The range selection is determined by the automatic range device to achieve optimum performance of the photomultiplier tube when receiving light in predetermined light level ranges.

2 Claims, 6 Drawing Figures

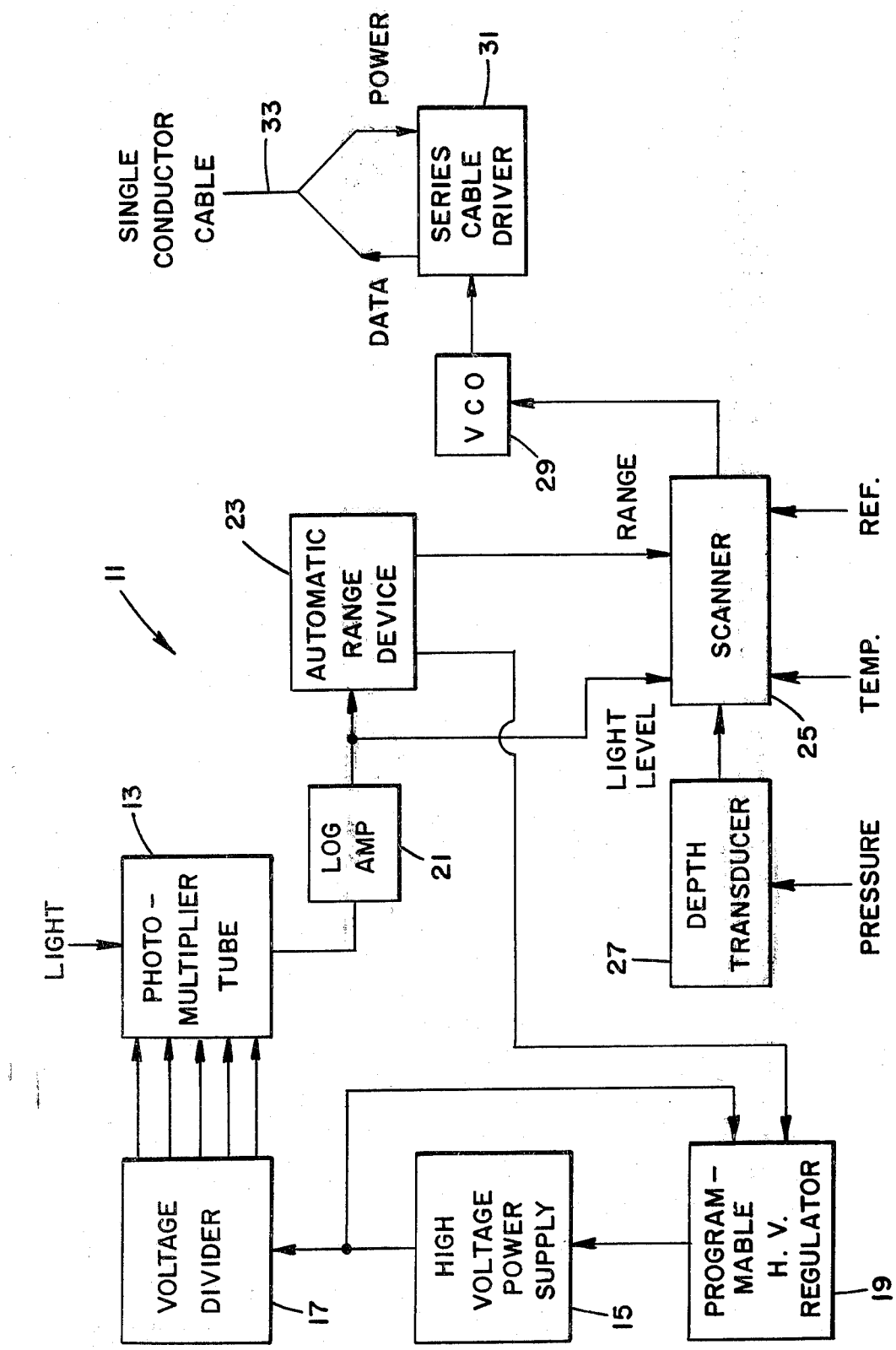
FIG_1

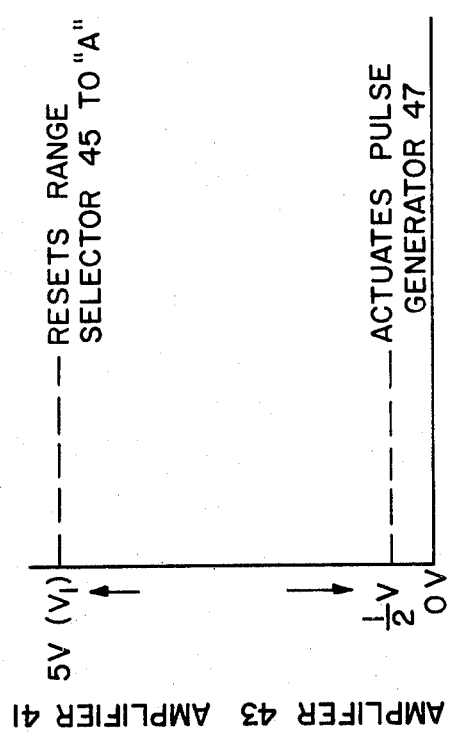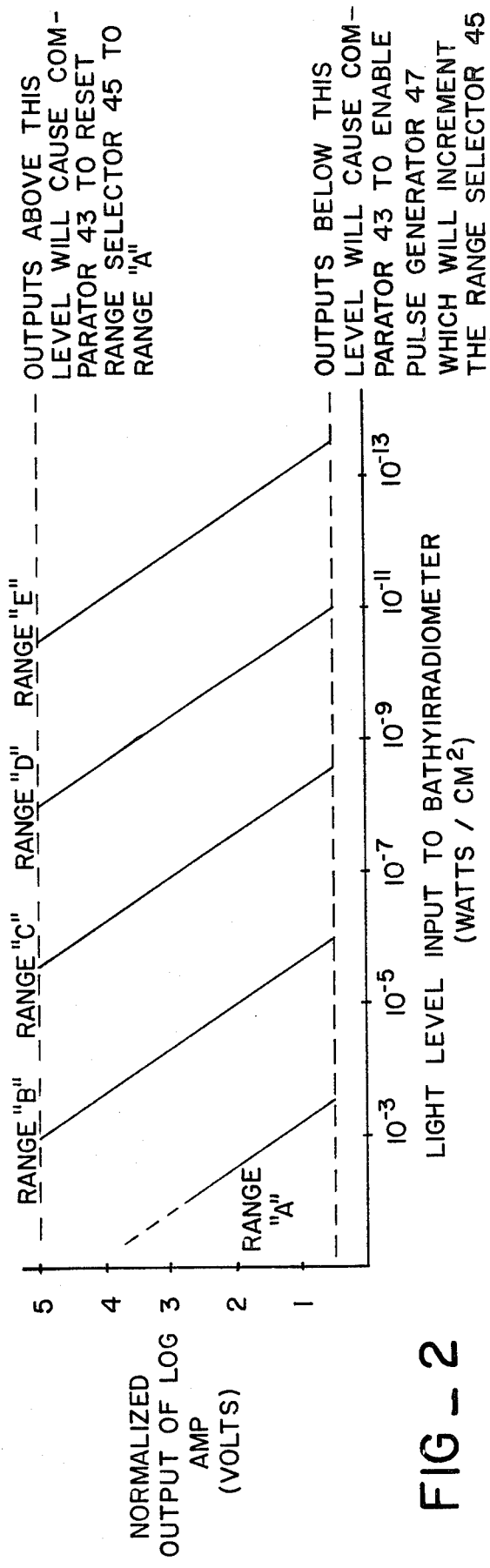

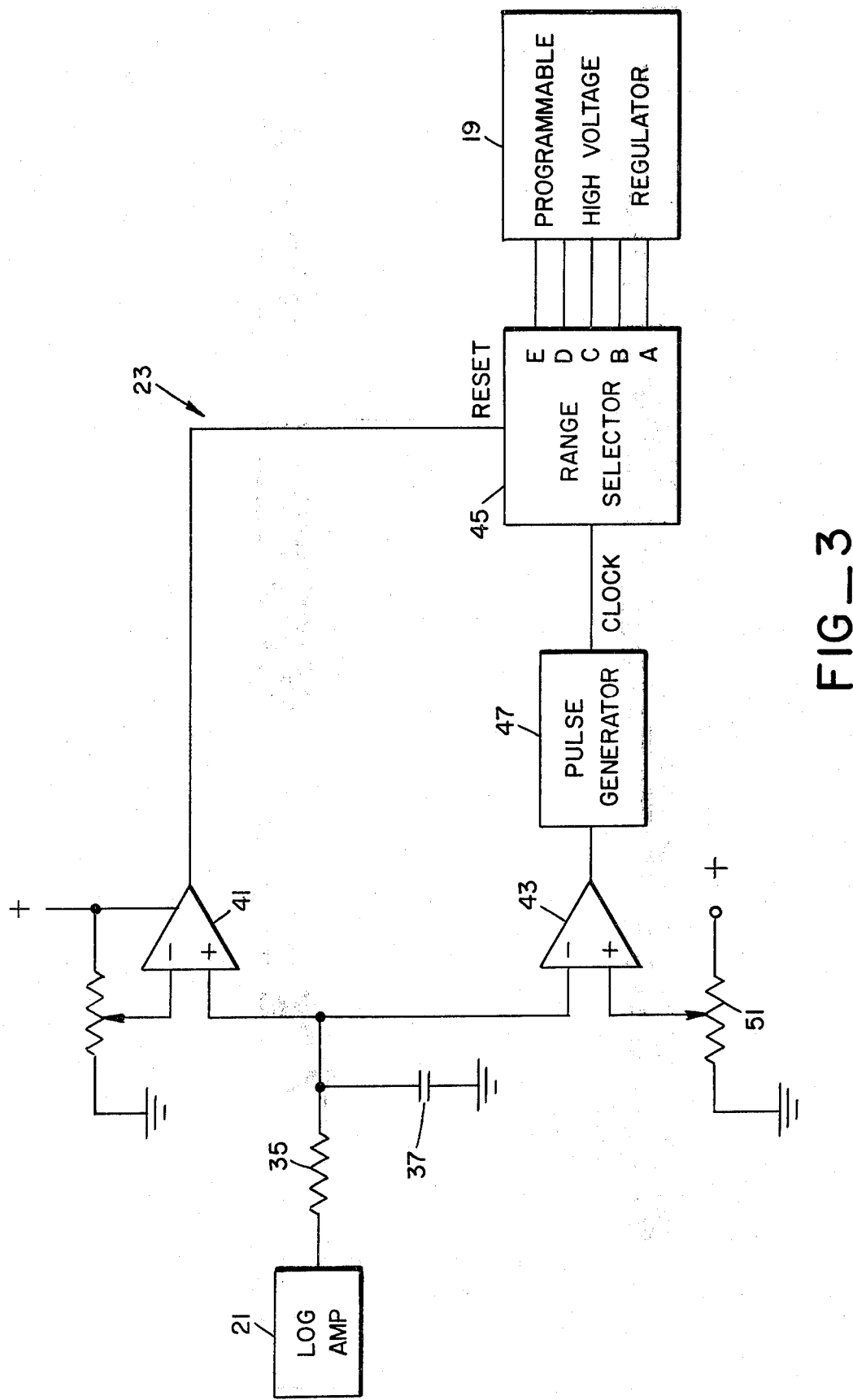
FIG_3

LIGHT RESPONSIVE BATHYIRRADIOMETER

BACKGROUND OF THE INVENTION

1. Field of the Invention

The present invention relates to a bathyirradiometer and more particularly to a bathyirradiometer that measures light levels and is controlled in response to its light input.

2. Description of the Prior Art

One of the difficulties encountered with prior bathyirradiometers that were employed to measure light levels in the ocean, for example, is that the photomultiplier tube was not operating at its optimum sensitivity. For example, for measuring very low levels of light it is necessary to employ photomultiplier tubes having very high sensitivity and, therefore, easily saturate when moderate levels of light are received at their inputs. Moreover, photomultiplier tubes have optimum resolution characteristics when receiving light intensity within a predetermined range and when the voltage applied to their dynodes are at a corresponding predetermined range. Prior systems have not taken into account these optimum performance conditions. The present invention overcomes these disadvantages by employing predetermined dynode voltage ranges for predetermined light ranges to achieve optimum resolution for all light conditions.

SUMMARY OF THE INVENTION

Briefly, the present invention comprises a bathyirradiometer that is employed to measure the light levels in situ. The bathyirradiometer includes a photomultiplier that detects light that is received at its light input. A high voltage power supply supplies power to a voltage divider the output of which is connected to the dynodes of the photomultiplier tube. The voltage level of the output of the high voltage power supply is selected by a programmable high voltage regulator. The output of the photomultiplier tube is applied to the input of a logarithmic amplifier the output of which is applied to the input of an automatic range device. One output of the automatic range device is applied to the programmable high voltage range detector to select the voltage to be applied across the dynodes of the photomultiplier tube. The other output of the automatic range device is applied to one input of a scanner to indicate the particular voltage range of operation. The range selection is determined by the automatic range device to achieve optimum performance of the photomultiplier tube when receiving light in predetermined light level ranges.

STATEMENT OF THE OBJECTS OF THE INVENTION

An object of the present invention is to provide a reliable bathyirradiometer.

Another object of the present invention is to provide a bathyirradiometer that measures the light levels in situ.

Still another object of the present invention is to provide a light responsive bathyirradiometer that achieves optimum resolution for all light conditions.

A still further object of the present invention is to provide a bathyirradiometer that employs predetermined photomultiplier dynode voltage ranges for predetermined light ranges to achieve optimum resolution for all light conditions.

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a block diagram of the circuitry of the present invention;

FIG. 2 is a curve illustrating the operation of the circuitry of FIG. 1; and

FIG. 3 is a schematic diagram of the automatic range device of FIG. 1;

FIGS. 4A, 4B and 4C are curves depicting the operation of automatic range device of FIG. 3.

DESCRIPTION OF THE PREFERRED EMBODIMENT

The present invention relates to a bathyirradiometer that is employed to measure the light levels in situ. In FIG. 1 is illustrated bathyirradiometer 11 of the present invention. Bathyirradiometer 11 includes a photomultiplier tube 13 that detects light that is received at its light input. High voltage power supply 15 supplies power to voltage divider 17 the output of which is connected to the dynodes of the photomultiplier tube 13. The voltage level of the output of high voltage power supply 15 is selected by programmable high voltage regulator 19 as will be hereinafter described in detail. The output of photomultiplier tube 13 is applied to the input of logarithmic amplifier 21 the output of which is applied to the input of automatic range device 23. One output of automatic range device 23 is applied to programmable high voltage range detector 19 to select the voltage to be applied across the dynodes of the photomultiplier tube 13. The other output of range device 23 is applied to one input of scanner 25 to indicate the particular voltage range of operation.

Scanner 25 sequentially scans a plurality of input signals. A pair of these input signals is the output of logarithmic amplifier 21 and the output of automatic range device 23. Together these two inputs indicate the actual light level since the output of logarithmic amplifier 21 indicates a measured light level and the output of automatic range device 23 denotes the scale or operating range of the photomultiplier tube 13. Other inputs to scanner 25 include a conventional reference signal, the output of depth transducer 27, the output of a temperature sensor and the like. These sequentially scanned signals are sequentially applied to the input of voltage controlled oscillator 29 the FM signal output of which is connected to the input of series cable driver 31 which then transmits the data over cable 33.

For measuring very low levels of light it is necessary to employ photomultiplier tubes having very high sensitivity and, therefore, easily saturate when moderate levels of light are received at their inputs. Moreover, photomultiplier tubes have optimum resolution characteristics when receiving light intensity within a predetermined range and when the voltage applied to their dynodes are at a corresponding predetermined range. As best depicted in FIG. 2 the range selection is determined by range device 23 to achieve optimum performance of the photomultiplier tube 13 when receiving a predetermined light level range. In FIG. 2 the absiccia indicates the light input to the photomultiplier tube 13 and the ordinate indicates the output of logarithmic amplifier 21. The function of automatic range device 23 is to select any of five ranges, (A, B, C, D and E as shown in FIG. 2) for example, as a function of five light level ranges. That is, when the level of light is minimum (range E), then the voltage applied to the photomultiplier is maximum and when the level of light is maximum (range A) then the voltage applied to the photomultiplier is minimum. Corresponding voltage ranges are employed with corresponding intermediate light ranges to achieve optimum resolution for all light conditions.

In FIG. 3 is a block diagram illustrating the automatic range device of FIG. 1. The output of logarithmic amplifier 21 is applied through resistor 35 to the positive input of comparator 41 and to the negative input of comparator 43. A capacitor 37, with resistor 35, form a single pole low-pass filter to filter unwanted AC signals or voltage spikes to ground.

The output of comparator 41 is applied to the reset input of discrete range selector 45. The output of comparitor 43 is applied to the reset input of pulse generator 47 the output of which is applied to the clock input of discrete range selector 45. The different DC current level outputs of discrete range selector 45 are indicated by reference letters A, B, C, D and E which correspond to the same characters of FIGS. 2, 3 and 4C. It is to be understood that greater or lesser discrete DC current outputs may be provided if required for greater or lesser sensitivity. The DC current level outputs of discrete range selector 45 are applied to the input of programmable high voltage regulator 19 which controls the voltage, in direct proportion to its current input from selector 45, that is applied to dynodes of the photomultiplier tube 13 of FIG. 1. When the output of logarithmic amplifier 21 is above a predetermined positive voltage, for example $+V_1$ of FIG. 4A, such as when the bathyirradiometer is initially lowered into the water, then an output signal is provided by comparator 43 that increments discrete range selector 45 to have the "B" range or voltage output $E_2$. If the voltage $E_2$ is still too low then comparator 43 will sense this and provide an output signal that actuates pulse generator 47 to provide a series of output pulses as illustrated in FIG. 4B. The initial pulse will cause voltage generator 45 to have a value $E_2$. If the output of logarithmic amplifier 21 is still too low, as measured by the compared outputs of the potentiometer 51, then the pulse generator 47 will produce another pulse that will shift voltage generator 45 to a higher voltage $E_3$. If this voltage is still too low then pulse generator 47 will produce a third pulse which will cause range selector 45 to shift to the next higher value $E_4$. If necessary, this will continue. $E_1$, which corresponds with the "A" range, will normally be the voltage output of range selector 45 when the bathyirradiometer is initially lowered into the water. As the bathyirradiometer is further lowered into the water the output of logarithmic amplifier 21 will drop below the E range voltage of FIG. 2 which will be sensed by comparitor 43 which will result in an output signal from comparitor 43 which will increment the discrete range selector 45 by enabling pulse generator 47 to provide an $E_2$ output signal. If the $E_2$ voltage is too small, comparitor 43 will again initiate operation of pulse generator 47. Pulse generator 47 will cause range selector 45 to produce output signals of $E_1$, $E_2$ and then stop at $E_3$ which corresponds to the "C" range. The above process will continue as the bathyirradiometer continues to be lowered into the ocean. That is, the next operating voltage of selector 45 will be $E_4$ or the "D" range, then $E_5$ or the "E" range. The "E" range is the minimum light level and maximum dynode voltage condition which occurs at the lowermost depth position of the bathyirradiometer.

As the bathyirradiometer is raised from the lower most depth position, the comparitor 41 will generate a reset that causes the range selector to have a voltage of $E_1$ representing the "A" range. Comparitor 43 will then cause the pulse generator 47 to increment the range selector 45 to $E_2$, $E_3$ and finally $E_4$. This will continue for $E_3$ ("C" range), $E_2$ ("B" range) and the $E_1$ ("A" range) which occurs when the bathyirradiometer is at or near the ocean surface.

What is claimed is:
1. A bathyirradiometer comprising:
   a. a photomultiplier tube;
   b. voltage supply means operatively connected to the dynodes of said photomultiplier tube for applying dynode voltage to the dynodes of said photomultiplier tube;
   c. the output of said photomultiplier tube being operatively connected to the signal of a first amplifier;
   d. the output of said first amplifier being operatively connected to the input of an automatic range device;
   e. one output of said automatic range device operatively connected to said voltage supply means;
   f. said automatic range device controls said voltage supply means to apply predetermined discrete dynode voltages in response to predetermined discrete voltage ranges from said first amplifier;
   g. said automatic range device controls said voltage supply means such that said predetermined discrete dynode voltage is maximum when said predetermined discrete voltage range of said first amplifier is minimum and said predetermined discrete dynode voltage is minimum when said predetermined discrete voltage range of the first amplifier is maximum;
   h. said automatic range device includes second and third amplifiers, a pulse generator and a range selector;
   i. the output of said first amplifier being operatively connected to the input of said second amplifier and to the input of said third amplifier, said second amplifier and said third amplifier are connected to act as comparators, comparing the output of the said first amplifier with an adjustable, predetermined voltage level;
   j. the output of said second amplifier being operably connected to a first input of said discrete range selector;
   k. the output of said third amplifier being operably connected to the input of said pulse generator, the output of which is operably connected to a second input of said discrete range selector; and
   l. the output of said discrete range selector being operably connected to the input of said voltage supply means.
2. The bathyirradiometer of claim 1 wherein:
   a. said discrete range selector includes reset means and clock means;
   b. said first input of said discrete range selector being operably connected to said reset means; and
   c. said second input of said discrete range selector being operably connected to said clock means.

* * * * *